United States Patent
Sukeda

(10) Patent No.: US 8,758,885 B2
(45) Date of Patent: Jun. 24, 2014

(54) LITHOGRAPHIC PRINTING PLATE MATERIAL

(75) Inventor: Saori Sukeda, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 89 days.

(21) Appl. No.: 13/635,426

(22) PCT Filed: Mar. 22, 2011

(86) PCT No.: PCT/JP2011/056824
§ 371 (c)(1),
(2), (4) Date: Sep. 15, 2012

(87) PCT Pub. No.: WO2011/122398
PCT Pub. Date: Oct. 6, 2011

(65) Prior Publication Data
US 2013/0011585 A1  Jan. 10, 2013

(30) Foreign Application Priority Data

Mar. 30, 2010  (JP) ................. 2010-076588

(51) Int. Cl.
*B32B 3/00* (2006.01)
*B32B 17/10* (2006.01)
*B32B 3/10* (2006.01)
*B32B 15/082* (2006.01)
*B32B 5/16* (2006.01)
*B32B 15/01* (2006.01)
*B32B 27/08* (2006.01)

(52) U.S. Cl.
CPC ............ *B32B 17/10761* (2013.01); *B32B 3/10* (2013.01); *B32B 15/082* (2013.01); *B32B 5/16* (2013.01); *B32B 15/012* (2013.01); *B32B 27/08* (2013.01)
USPC ........ 428/206; 428/195.1; 428/209; 428/323; 428/460; 428/501; 428/524

(58) Field of Classification Search
CPC .. B32B 17/10761; B32B 3/10; B32B 15/082; B32B 5/16; B32B 15/012; B32B 27/08
USPC ............. 428/195.1, 206, 209, 323, 460, 501, 428/524
See application file for complete search history.

(56) References Cited

U.S. PATENT DOCUMENTS

| | | | |
|---|---|---|---|
| 4,686,138 A | 8/1987 | Toyama et al. | |
| 6,180,213 B1 | 1/2001 | Kuroki et al. | |
| 2002/0192436 A1* | 12/2002 | Voeght et al. | ................. 428/195 |
| 2007/0160935 A1* | 7/2007 | Okajima | ...................... 430/302 |

FOREIGN PATENT DOCUMENTS

| | | |
|---|---|---|
| JP | 59-174394 A | 10/1984 |
| JP | 61-3797 A | 1/1986 |
| JP | 61-286200 A | 12/1986 |
| JP | 5-269958 A | 10/1993 |
| JP | 11-95417 A | 4/1999 |
| JP | 2006-248143 A | 9/2006 |
| JP | 2007-190879 A | 8/2007 |
| JP | 2008-290449 A | 12/2008 |
| JP | 2009-45790 A | 3/2009 |

OTHER PUBLICATIONS

International Search Report for PCT/JP2011/056824 dated Apr. 19, 2011.

* cited by examiner

*Primary Examiner* — Betelhem Shewareged
(74) *Attorney, Agent, or Firm* — Kenealy Vaidya LLP

(57) ABSTRACT

Provided is a lithographic printing plate material having an excellent balance between printing durability and ink-absorbing capability. The lithographic printing plate material has an image-receiving layer on a support, wherein the image-receiving layer contains acetoacetyl-modified polyvinyl alcohol as a resin component, and contains at least 0.4 parts by weight of acetylene glycol per 100 parts by weight of the resin component. The image-receiving layer preferably contains 100 to 300 parts by weight of particles having a mean particle size of 7 to 50 nm, per 100 parts by weight of the resin component. In addition, the support is formed using aluminum that has been subjected to anodic oxidation.

19 Claims, No Drawings

LITHOGRAPHIC PRINTING PLATE MATERIAL

This application is a U.S. national phase filing under 35 U.S.C. §371 of PCT Application. No. PCT/JP2011/056824, filed on Mar. 22, 2011, and claims priority under 35 U.S.C. §119 to Japanese patent application no. 2010-076588, filed Mar. 30, 2010, the entireties of both which are incorporated herein by reference.

TECHNICAL FIELD

The present invention relates to a material for preparing a lithographic printing plate (hereinafter may be referred to also as a printing plate) using an ink-jet printer.

BACKGROUND ART

Methods for directly making a printing plate, without outputting an image signal from a computer on photographic paper or a lith film, using an output device such as an electrophotographic printer, a thermal-transfer printer, or an ink-jet printer (direct plate-making methods) have recently been proposed with the development of business equipment and the progress of office automation equipment.

Among the direct plate-making methods, those using the ink-jet printer are advantageously capable of high-speed processing or the like, and various proposals have been made for the apparatus and the material to be used for the plate-making methods (Patent Documents 1 and 2).

In the methods using the ink-jet printer, when a metal support for a PS plate or a synthetic resin support composed of a polyester or the like, which do not have a layer capable of satisfactorily retaining an ink on the surface, is used without modification as a lithographic printing plate material, an excellent image cannot be formed due to bleeding of the ink on the surface. Therefore, an image-receiving layer for absorbing the ink is formed on the surface of the support. Such a material having the image-receiving layer has been developed in view of improving a balance between ink-absorbing capability and printability.

PRIOR ART DOCUMENTS

Patent Documents

Patent Document 1: JP-A-5-269958 (claims)
Patent Document 2: JP-A-2009-45790 (claims)

DISCLOSURE OF THE INVENTION

Problem to be Solved by the Invention

The lithographic printing plate material is required to have a satisfactory printing durability in addition to the above ink-absorbing capability and printability. However, the printing durability and the ink-absorbing capability are conflicting properties, and it is difficult to improve both the properties.

Thus, when the crosslink density of the image-receiving layer is increased, though the image-receiving layer can be hardened to improve the printing durability, the ink cannot readily penetrate into the image-receiving layer and is likely to bleed. On the other hand, when the crosslink density of the image-receiving layer is lowered, though the ink bleeding can be prevented, a gap is easily formed in an image in a printing step, failing to obtain the satisfactory printing durability.

Accordingly, an object of the present invention is to provide a lithographic printing plate material that has the satisfactory ink-absorbing capability and is excellent in the printability, particularly in the printing durability.

Solutions to the Problem

In view of solving the above problem, according to the present invention, there is provided a lithographic printing plate material having a support and an image-receiving layer formed thereon, wherein the image-receiving layer contains an acetoacetyl-modified polyvinyl alcohol as a resin component and contains at least 0.4 parts by weight of acetylene glycol per 100 parts by weight of the resin component.

In the lithographic printing plate material of the invention, the support may be aluminum that has been subjected to anodic oxidation.

Effects of the Invention

In the lithographic printing plate material of the present invention, since the image-receiving layer contains an acetoacetyl-modified polyvinyl alcohol as a resin component, the water resistance of the image-receiving layer can be improved by crosslinking. Furthermore, since the image-receiving layer contains acetylene glycol, the surface wettability of the image-receiving layer can be improved without lowering the crosslinking degree of the acetoacetyl-modified polyvinyl alcohol, and therefore the ink-absorbing capability can be improved. Consequently, the lithographic printing plate material can have an excellent balance between the printing durability and the ink-absorbing capability (ink-jet printability).

In addition, in the lithographic printing plate material of the invention, the printing durability can be greatly improved by using aluminum that has been subjected to anodic oxidation in the support.

MODE FOR CARRYING OUT THE INVENTION

An embodiment of the lithographic printing plate material of the present invention will be described below.

An image-receiving layer acts to absorb an ink-jet ink to form an image. Thus, a lipophilic portion and a hydrophilic portion are formed on the surface of the image-receiving layer to prepare a printing plate capable of printing. Specifically, the image area corresponding to the lipophilic portion retains the print ink, while the non-image area corresponding to the hydrophilic portion retains dampening water and repels the print ink.

The image-receiving layer contains a resin component, and a hydrophilizing component, a pigment, and an additive may be added thereto if necessary. The lithographic printing plate material of the invention utilizes an acetoacetyl-modified polyvinyl alcohol as the resin component. The acetoacetyl-modified polyvinyl alcohol is a modified polyvinyl alcohol having an acetoacetyl group in a part of the side chains of the polyvinyl alcohol.

The acetoacetyl-modified polyvinyl alcohol preferably has a saponification degree of at least 80.0 mol %, and more preferably 90.0 to 99.0 mol %. When the saponification degree is at least 80.0 mol %, the printing durability can be easily improved. When the saponification degree is at least 90.0 mol %, the printing durability can be more easily improved.

The acetoacetyl-modified polyvinyl alcohol preferably has an average degree of polymerization of at least 1000. When the average degree of polymerization of the acetoacetyl-modified polyvinyl alcohol is at least 1000, the physical strength of the entire image-receiving layer can be improved. Therefore, the image-receiving layer is hardly dropped off in the printing process, and the printing plate can be easily prepared with an excellent printing durability. The average degree of polymerization is preferably 2500 or less. When the average degree of polymerization is within this range, an aqueous resin solution used as a coating liquid for the image-receiving layer can have a low viscosity, so that coating unevenness can be reduced.

The image-receiving layer may contain a polyvinyl alcohol, a carboxymethylcellulose, a hydroxyethylcellulose, a casein, a gelatin, a water-soluble polyurethane, and the like as other resin components in addition to the acetoacetyl-modified polyvinyl alcohol. However, the weight ratio of the acetoacetyl-modified polyvinyl alcohol to the total of the resin components in the image-receiving layer is preferably at least 80% by weight, and more preferably 100% by weight. When the weight ratio is at least 80% by weight, the water resistance can be easily improved.

The image-receiving layer preferably contains a crosslinker as a resin component. The crosslinking of the resin component containing mainly the acetoacetyl-modified polyvinyl alcohol can be enhanced by adding the crosslinker to improve the strength and the water resistance of the image-receiving layer. The crosslinker may be an isocyanate-based compound, an aldehyde-based compound, or the like. Among them, particularly an aldehyde-based compound is preferred because of its high reactivity for the crosslinking of the acetoacetyl-modified polyvinyl alcohol.

Examples of the aldehyde compounds include malondialdehyde, succindialdehyde, maleindialdehyde, glutardialdehyde, formaldehyde, acetaldehyde, benzaldehyde, and dialdehyde (glyoxal). Among them, dialdehyde is preferred from the viewpoint of efficiently crosslinking the acetoacetyl-modified polyvinyl alcohol. The cohesive force of the image-receiving layer can be increased, whereby the water resistance can be improved, by crosslinking the acetoacetyl-modified polyvinyl alcohol.

The weight ratio of the crosslinker to the total of the resin components in the image-receiving layer is preferably 5 to 40% by weight in view of increasing the crosslinking degree.

The image-receiving layer used in the invention contains acetylene glycol in addition to the resin component. The ink-absorbing capability of the image-receiving layer can be improved by adding the acetylene glycol without deteriorating the water resistance improving effect of the crosslinked resin component. The image-receiving layer used in the invention can contain a large amount of the acetylene glycol due to the presence of the acetoacetyl-modified polyvinyl alcohol as the resin component. This may be because a large amount of an alcohol can be used in the solvent due to the presence of the acetoacetyl group to improve the dispersion of the acetylene glycol.

Since the image-receiving layer contains a large amount of the acetylene glycol in addition to the acetoacetyl-modified polyvinyl alcohol, the following advantageous effects can be attained by the invention.

The printed ink can be rapidly dried and prevented from bleeding advantageously. This effect is achieved for the following reasons. First, by adding a large amount of the acetylene glycol, the surface wettability of the image-receiving layer can be increased, and the printed ink can be appropriately readily spread on the layer surface. Second, by adding a large amount of the acetylene glycol, the solvent of the ink can be readily absorbed by the image-receiving layer. Therefore, the spread and the penetration of the ink can be synergistically improved on the surface of the image-receiving layer, whereby the ink-absorbing capability can be further improved. This effect can be obtained without lowering the crosslinking degree of the acetoacetyl-modified polyvinyl alcohol. Thus, in the invention, the disadvantage of the crosslinking (the ink-absorbing capability deterioration) can be overcome without losing the effect by increasing the crosslinking degree (the high water resistance).

Furthermore, though in general the rub resistance is deteriorated by an additive, the rub resistance is not deteriorated by adding the acetylene glycol to the image-receiving layer. Thus, in general, when the crosslinking degree is increased, the coating film is hardened to improve the printing durability. However, when other components are added to the coating film where the printing durability is improved, the printing durability is deteriorated. However, the printing durability deterioration can be prevented even when the other component of the acetylene glycol is added. This may be because the acetylene glycol is introduced into the image-receiving layer without inhibiting the crosslinking degree of the acetoacetyl-modified polyvinyl alcohol, the image-receiving layer is made flexible by the acetylene glycol, the stress applied to the image-receiving layer in the printing process (the total of various actions, such as pressing forces, tensile forces, forces for displacing from the support, and forces for peeling from the support, added onto the layer at a time of winding around a plate cylinder, bringing into contact with a blanket, and the like) is relaxed, and therefore the image-receiving layer is prevented from dropping off in the printing process. Consequently, a gap is hardly formed in the image of the printed ink on the image-receiving layer, and the image retention can be increased even under the stress applied in the printing process.

When the support contains a hard component (e.g., aluminum), the stress applied to the image-receiving layer in the printing process is significantly increased. Even such increased stress can be relaxed according to the invention.

The amount of the acetylene glycol added to the image-receiving layer is at least 0.4 parts by weight, and preferably at least 0.45 parts by weight, per 100 parts by weight of the resin component. When the amount is at least 0.4 parts by weight, the above-described effects are achieved.

The upper limit of the amount of the acetylene glycol added to the image-receiving layer is preferably 2.5 parts by weight or less, and more preferably 1.5 parts by weight or less, per 100 parts by weight of the resin component. When the amount is 2.5 parts by weight or less, the lithographic printing plate material can be easily prepared with an excellent balance between the printing durability and the printability.

In the invention, the image-receiving layer contains the combination of the acetoacetyl-modified polyvinyl alcohol and the acetylene glycol, and thereby can have both of "ink-drying property (bleeding prevention property)" and "printing durability", which cannot be obtained only by controlling the crosslinking degree.

Further, the image-receiving layer used in the invention preferably contains particles having a mean particle size (diameter) of 7 to 50 nm, and particularly preferably contains fine particles having a mean particle size of 7 to nm. In combination with the particles having a mean particle size of 7 to 50 nm, particles having a mean particle size of more than 50 nm may be added.

The ink-absorbing capability of the image-receiving layer can be improved by adding the particles having a mean particle size of 7 to 50 nm. For example, a void can be formed by the resin component and the particles in the image-receiving layer, and a structure suitable for absorbing the ink can be densely formed by using the fine particles. For this reason, the ink can readily penetrate into the image-receiving layer. Furthermore, the ink can be prevented from spreading and bleeding on the surface of the image-receiving layer.

Particularly in the case of using the particles having a mean particle size of 7 to 25 nm, a significant effect of preventing scumming in the printing process can be obtained in addition to the above effect. The scumming occurrence and the scumming prevention effect of the particles are considered to be caused in the following manner.

As described above, in the invention, by using the acetoacetyl-modified polyvinyl alcohol in combination with the acetylene glycol, the resistance of the image-receiving layer against the stress applied in the printing process can be improved to increase the image retention. However, when the image-receiving layer is continuously used for printing a large number of sheets, the probability of the gap formation in the image-receiving layer may be increased although gradually. The gap of the image-receiving layer is more often generated in the non-image area not covered with the ink than the image area covered with the ink. Consequently, the non-image area often loses the hydrophilicity to cause the scumming. In contrast, in the case of using the fine particles having a mean particle size of 7 to 25 nm, the image-receiving layer can have dense composition and thus further improved resistance against the stress. The particles have the effect on both of the image area covered with the ink and the non-image area not covered with the ink, so that the scumming can be prevented in the non-image area, and the image retention can be further increased in the image area.

In the case of using only the particles having a mean particle size of more than 50 nm, the scumming occurs more often. However, in the case of using them in combination with the particles having a mean particle size of 7 to 50 nm, the surface unevenness of the image-receiving layer can be easily controlled to improve the water retention.

In the image-receiving layer used in the invention, the total amount of all the particles is preferably 300 parts by weight or less per 100 parts by weight of the resin component.

The amount of the particles having a mean particle size of 7 to 50 nm added is preferably 100 to 300 parts by weight, and more preferably 130 to 200 parts by weight, per 100 parts by weight of the resin component, in view of increasing the ink-absorbing capability.

The amount of the particles having a mean particle size of more than 50 nm added is preferably 10 parts by weight or less per 100 parts by weight of the resin component, in view of preventing the scumming.

The particles include those of inorganic pigments such as silicas, zinc oxides, titanium oxides, clays, kaolins, aluminum hydroxides, and aluminas. Among them, aluminum-containing silica composite oxides are preferred from the viewpoints of the ink-absorbing capability and the dampening water retention.

The thickness of the image-receiving layer is not particularly limited and is generally about 2.0 to 10.0 μm.

The support, on which the image-receiving layer is formed, may be a plastic film consisting of a resin such as a polyester, a polycarbonate, a polyethylene, a polypropylene, a polyvinyl chloride, a polystyrene, or a polyethylene terephthalate, waterproof paper having a surface laminated or coated with the resin, or a metal plate consisting of a metal such as iron, copper, zinc, or aluminum.

The plastic film is preferably a polyethylene terephthalate film excellent in mechanical strength, dimension stability, chemical resistance, and water resistance.

The metal plate is preferably an anodic-oxidized aluminum sheet excellent in mechanical strength, dimension stability, water resistance, and printing durability.

The anodic-oxidized aluminum may be prepared by forming a porous structure (an alumina film) on an aluminum surface using a known method. The thickness of the alumina film may be 0.1 μm or more and 50.0 μm or less. The thickness is more preferably at least 3.0 μm in view of the adhesiveness, and is more preferably 30.0 μm or less in view of the cost.

The support may be subjected to a plasma treatment, a corona discharge treatment, a far-ultraviolet radiation treatment, or the like, in order to improve the adhesiveness between the support and the image-receiving layer.

The thickness of the support is not particularly limited and may be 50.0 to 300.0 μm in either case of using the resin film or the anodic-oxidized aluminum.

An undercoat layer may be disposed between the support and the image-receiving layer in order to improve the adhesiveness. The undercoat layer preferably contains a resin having an excellent adhesiveness to the resins constituting both of the support and the image-receiving layer. Therefore, the resin constituting the undercoat layer may be selected depending on the resins to be used in the support and the image-receiving layer. Examples of the resins in the undercoat layer include polymers and copolymers of vinyl acetate, vinyl chloride, styrene, butadiene, an acrylic ester, a methacrylic ester, ethylene, acrylonitrile, and the like; polyester resins, polyurethane resins, alkyd resins, epoxy resins, polyvinyl alcohols, carboxymethylcelluloses, hydroxyethylcelluloses, caseins, gelatins, water-soluble polyurethanes, and isocyanate-based compounds. The resins may be used alone or in combination of two or more thereof.

When a polyester or an anodic-oxidized aluminum is used as the support, the undercoat layer preferably contains a polyester-based resin and an isocyanate-based compound in view of achieving the excellent adhesiveness between the support and the image-receiving layer.

It is considered that the undercoat layer containing a polyester resin and an isocyanate-based compound is firmly bonded to the support containing an anodic-oxidized aluminum for the following reasons.

For example, an OH group in the alumina film is reacted with the isocyanate compound in the undercoat layer, whereby the undercoat layer is firmly bonded to the support containing an anodic-oxidized aluminum. In addition, the polyester in the undercoat layer has excellent adhesion and compatibility with the acetoacetyl-modified polyvinyl alcohol in the image-receiving layer. Consequently, the undercoat layer is well adapted to the image-receiving layer to improve the adhesiveness therebetween.

Furthermore, the undercoat layer may be firmly bonded to the image-receiving layer by crosslinking the isocyanate in the undercoat layer with the acetoacetyl-modified polyvinyl alcohol in the image-receiving layer.

The thickness of the undercoat layer is not particularly limited and is generally about 0.1 to 5.0 μm.

The undercoat layer and the image-receiving layer may contain a colorant such as a dye or a pigment and an additive such as a leveling agent, an ultraviolet absorber, or an antioxidant as long as they do not inhibit the above-described performance.

The undercoat layer and the image-receiving layer may be formed by a method of dissolving or dispersing the layer component in an appropriate solvent to prepare a coating liquid; applying the coating liquid to the support or the undercoat layer using a known method such as a roll coating method, a bar coating method, a spray coating method, or an air knife coating method; and drying the applied coating liquid.

In the lithographic printing plate material of the invention, the image-receiving layer can be flexible and thus can be formed even on the hard support containing aluminum or the like with compatibility. Even in this case, the image-receiving layer can be excellent in both of the printing durability and the ink-absorbing capability. Furthermore, the support containing aluminum has a remarkable effect of significantly improving the durability of the printing plate.

EXAMPLES

The present invention will be described below with reference to Examples. In Examples, "parts" and "percentages" are by weight unless otherwise indicated.

Example 1

An undercoat layer coating liquid having the following composition was applied by a bar coating method to a support of a 150-μm-thick anodic-oxidized aluminum plate (Nihon Anodizing Co., Ltd.) to form an undercoat layer having a dry thickness of 2 μm.
<Undercoat Layer Coating Liquid>

| | |
|---|---|
| Polyester resin (a solid content of 100%) | 11.0 parts |
| (Elitel UE3201: available from UNITIKA LTD.) | |
| Isocyanate prepolymer | 1.0 part |
| (Takenate D110N: available from Takeda Pharmaceutical Co., Ltd., a solid content of 60%) | |
| Diluting solvent | 88.0 parts |

Then, an image-receiving layer coating liquid having the following composition was applied to the undercoat layer and dried to form an image-receiving layer having a thickness of 4 μm, whereby a lithographic printing plate material of Example 1 was produced.
<Image-Receiving Layer Coating Liquid>

| | |
|---|---|
| Acetoacetyl-modified polyvinyl alcohol | 89.0 parts |
| (Gohsefimer Z210: available from The Nippon Synthetic Chemical Industry Co., Ltd.) | |
| (a saponification degree of 95.0 to 97.0 mol % and an average degree of polymerization of 1100) | |
| (about 5 mol % of the saponified portions being acetoacetylated) | |
| Glyoxal | 11.0 parts |
| Acetylene glycol | 0.57 parts |
| (Olfine Exp4036: available from Nissin Chemical Industry Co., Ltd., an active ingredient content of 80%) | |
| Methanol-denatured ethanol | 300.0 parts |
| Distillated water | 2500.0 parts |
| Fine particles (containing silica, aluminum) | 150.0 parts |
| (Aerosil MOX170: available from Nippon Aerosil Co., Ltd., a mean particle size of 15 nm) | |

Example 2

A lithographic printing plate material of Example 2 was produced in the same manner as in Example 1 except for changing the amount of the acetylene glycol in the image-receiving layer coating liquid from 0.57 parts to 1.87 parts.

Example 3

A lithographic printing plate material of Example 3 was produced in the same manner as in Example 1 except for using a support of a 188-μm-thick polyester film (Lumirror S10: available from Toray Industries, Inc.) instead of the support of the anodic-oxidized aluminum plate.

Example 4

A lithographic printing plate material of Example 4 was produced in the same manner as Example 1 except for using fine particles (containing silica, aluminum) (Aerosil MOX80 available from Nippon Aerosil Co., Ltd.) having a mean particle size of 30 nm instead of the above fine particles in the image-receiving layer coating liquid.

Comparative Example 1

A lithographic printing plate material of Comparative Example 1 was produced in the same manner as in Example 1 except for using 100.0 parts of a common polyvinyl alcohol (Gohsenol NH20: available from The Nippon Synthetic Chemical Industry Co., Ltd., a saponification degree of 98.5 to 99.4 mol % and an average degree of polymerization of 2000) instead of the acetoacetyl-modified polyvinyl alcohol in the image-receiving layer coating liquid.

Comparative Example 2

A lithographic printing plate material of Comparative Example 2 was produced in the same manner as in Example 1 except for not using 0.57 parts of the acetylene glycol in the image-receiving layer coating liquid.

Then, the lithographic printing plate materials of Examples 1 to 4 and Comparative Examples 1 and 2 were evaluated with respect to the following items. The evaluation results are shown in Table 1.
(1) Printing Durability (Image Retention)

A halftone dot image with a gradation of 5% to 80% (150 lines/inch) was output on each of the lithographic printing plate materials of Examples 1 to 4 and Comparative Examples 1 and 2 by an ink-jet printer (Kimosetter 525: manufactured by KIMOTO CO., LTD.) using an ionizing radiation curable resin as an ink component. The obtained printing plate was placed in an abrasion testing machine (Suga abrasion tester NUS-ISO-1: manufactured by Suga Test Instruments Co., Ltd.), and was tested under the following conditions. The image area of the printing plate was attached to a flat sample stage in the abrasion testing machine, and water-containing paper (Panelon pad: available from DYNIC CORP.) was wound on a rotatable roll facing the sample stage. Then, the rotatable roll was brought into contact with the printing plate, and the surface of the printing plate was rubbed 100 reciprocations. The surface of the resultant printing plate was then visually observed to evaluate the image retention. The printing plate was evaluated as Excellent when the image retention was at least 95%, as Fair when the image retention was at least 70% and less than 95%, and as Poor when the image retention was less than 70%.
(2) Printing Durability (Scumming)

An image was printed to form an image area and a non-image area on each of the lithographic printing plate materials of Examples 1 to 4 and Comparative Examples 1 and 2, and the obtained printing plate was placed in an offset printing machine (HEIDELBERG GTO 52: manufactured by Heidelberger Druckmaschinen AG). Then, the printing plate was subjected to a printing process using dampening water prepared by diluting commercially available dampening water (Astro Mark 10: available from Nikken Chemical Laboratory Co., Ltd.) 50-fold with tap water and a print ink (TK NEX:

available from Toyo Ink Manufacturing Co., Ltd.), and the scumming occurrence was observed in the non-image area. The printing plate was evaluated as Excellent when the scumming of the printing plate was not observed in the process of printing on at least 10000 sheets, as Fair when the scumming was observed in the process of printing on at least 5000 and less than 10000 sheets, and as Poor when the scumming was observed in the process of printing on less than 5000 sheets.

(3) Image Bleeding (Ink-Jet Printability)

A halftone dot image of 70% (150 lines/inch) was output on each of the lithographic printing plate materials of Examples 1 to 4 and Comparative Examples 1 and 2 by the above ink-jet printer under the conditions of 20° C. and 50% RH to obtain a lithographic printing plate. The output image was observed using a loupe at 15-fold magnification. The printing plate was evaluated as Excellent when the dots were not connected and no bleeding was observed and as Poor when a large number of the dots were connected to cause bleeding on the printing plate.

TABLE 1

|  | Printing durability (image retention) | Printing durability (scumming) | Bleeding |
|---|---|---|---|
| Example 1 | Excellent | Excellent | Excellent |
| Example 2 | Excellent | Excellent | Excellent |
| Example 3 | Excellent | Excellent | Excellent |
| Example 4 | Excellent | Fair | Excellent |
| Comparative Example 1 | Poor | Poor | Excellent |
| Comparative Example 2 | Fair | Excellent | Poor |

As is clear from the results shown in Table 1, the lithographic printing plate materials of Examples 1 to 4 contained the acetoacetyl-modified polyvinyl alcohol as the resin component and further contained at least 0.4 parts by weight of the acetylene glycol per 100 parts by weight of the resin component in the image-receiving layer, and thus were excellent in both of the printing durability and the bleeding. In particular, the lithographic printing plate materials of Examples 1 to 3 containing the particles having a mean particle size of 7 to 25 nm in the image-receiving layer were superior in the rub resistance and the prevention of the scumming in the printing process to that of Example 4 containing the particles having a mean particle size of 30 nm.

On the other hand, the lithographic printing plate material of Comparative Example 1 contained the common polyvinyl alcohol instead of the acetoacetyl-modified polyvinyl alcohol as the resin component in the image-receiving layer, and thus did not have a satisfactory crosslinking degree and exhibited the poor printing durability with a large number of image gaps.

Furthermore, the lithographic printing plate material of Comparative Example 2 contained the acetoacetyl-modified polyvinyl alcohol as the resin component but did not contain the acetylene glycol in the image-receiving layer, and thus was inferior in the image retention to the materials of Examples 1 to 4. In addition, the printed ink was not absorbed by the image-receiving layer and remained on the layer surface. Therefore, the ink could not be rapidly dried, so that a large number of the printed lines were connected. Thus, the material of Comparative Example 2 did not have a satisfactory bleeding prevention property.

As is clear from Examples, according to the present invention, an excellent lithographic printing plate material can be obtained with an excellent balance between printing durability and ink-absorbing capability.

The invention claimed is:

1. A lithographic printing plate material comprising a support and an image-receiving layer formed thereon, wherein the image-receiving layer contains an acetoacetyl-modified polyvinyl alcohol as a resin component and contains at least 0.4 parts by weight of acetylene glycol per 100 parts by weight of the resin component.

2. The lithographic printing plate material according to claim 1, wherein the image-receiving layer contains at least 80% by weight of the acetoacetyl-modified polyvinyl alcohol based on the total resin component weight.

3. The lithographic printing plate material according to claim 1, wherein the image-receiving layer contains 100 to 300 parts by weight of particles having a mean particle size of 7 to 50 nm per 100 parts by weight of the resin component.

4. The lithographic printing plate material according to claim 1, wherein the image-receiving layer contains 100 to 300 parts by weight of particles having a mean particle size of 7 to 25 nm per 100 parts by weight of the resin component.

5. The lithographic printing plate material according to claim 1, wherein the image-receiving layer further contains a crosslinker as a resin component.

6. The lithographic printing plate material according to claim 5, wherein the crosslinker is an aldehyde compound.

7. The lithographic printing plate material according to claim 1, wherein the support is an aluminum that has been subjected to anodic oxidation.

8. The lithographic printing plate material according to claim 1, wherein an undercoat layer containing a polyester resin and an isocyanate prepolymer is formed between the support and the image-receiving layer.

9. The lithographic printing plate material according to claim 2, wherein the image-receiving layer contains 100 to 300 parts by weight of particles having a mean particle size of 7 to 50 nm per 100 parts by weight of the resin component.

10. The lithographic printing plate material according to claim 2, wherein the image-receiving layer contains 100 to 300 parts by weight of particles having a mean particle size of 7 to 25 nm per 100 parts by weight of the resin component.

11. The lithographic printing plate material according to claim 2, wherein the image-receiving layer further contains a crosslinker as a resin component.

12. The lithographic printing plate material according to claim 3, wherein the image-receiving layer further contains a crosslinker as a resin component.

13. The lithographic printing plate material according to claim 4, wherein the image-receiving layer further contains a crosslinker as a resin component.

14. The lithographic printing plate material according to claim 2, wherein the support contains an aluminum that has been subjected to anodic oxidation.

15. The lithographic printing plate material according to claim 3, wherein the support contains an aluminum that has been subjected to anodic oxidation.

16. The lithographic printing plate material according to claim 4, wherein the support contains an aluminum that has been subjected to anodic oxidation.

17. The lithographic printing plate material according to claim 2, wherein an undercoat layer containing a polyester resin and an isocyanate prepolymer is formed between the support and the image-receiving layer.

18. The lithographic printing plate material according to claim 3, wherein an undercoat layer containing a polyester resin and an isocyanate prepolymer is formed between the support and the image-receiving layer.

19. The lithographic printing plate material according to claim 4, wherein an undercoat layer containing a polyester resin and an isocyanate prepolymer is formed between the support and the image-receiving layer.

* * * * *